(12) United States Patent
Nakayama et al.

(10) Patent No.: US 10,099,121 B2
(45) Date of Patent: *Oct. 16, 2018

(54) GAMING CONTROLLER

(71) Applicant: Sony Interactive Entertainment America LLC, San Mateo, CA (US)

(72) Inventors: Ryuji Nakayama, Tokyo (JP); Ennin Huang, Fremont, CA (US); Nathan Gary, Santa Monica, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,397

(22) Filed: Sep. 29, 2017

(65) Prior Publication Data

US 2018/0021674 A1    Jan. 25, 2018

Related U.S. Application Data

(63) Continuation of application No. 15/133,173, filed on Apr. 19, 2016, now Pat. No. 9,776,080, which is a
(Continued)

(51) Int. Cl.
*A63F 13/06*         (2006.01)
*A63F 13/24*         (2014.01)
(Continued)

(52) U.S. Cl.
CPC .............. *A63F 13/24* (2014.09); *A63F 13/21* (2014.09); *A63F 13/211* (2014.09); *A63F 13/213* (2014.09); *A63F 13/214* (2014.09); *A63F 13/2145* (2014.09); *A63F 13/235* (2014.09); *A63F 13/30* (2014.09); *A63F 13/54* (2014.09); *G06F 3/033* (2013.01); *G06F 3/0488* (2013.01); *H04W 4/008* (2013.01); *H04W 4/80* (2018.02);
(Continued)

(58) Field of Classification Search
USPC .......................................... 463/31, 37, 38, 42
See application file for complete search history.

(56) References Cited

U.S. PATENT DOCUMENTS 6,186,896 B1 * 2/2001 Takeda .................... A63F 13/02
                                                        273/148 B
7,314,413 B2 * 1/2008 Ogata ..................... A63F 13/06
                                                        273/148 B
(Continued)

*Primary Examiner* — Pierre E Elisca
(74) *Attorney, Agent, or Firm* — Martine Penilla Group, LLP

(57) ABSTRACT

A controller for interfacing wirelessly with a computing device is provided, including the following: a housing defined by a main body, a first extension extending from a first end of the main body, and a second extension extending from a second end of the main body, the first extension and the second extension for holding by a first hand and a second hand of a user, respectively; a touchscreen defined along the top surface of the main body between the first extension and the second extension; a first set of buttons disposed on the top surface of the main body proximate to the first extension and on a first side of the touchscreen; and a second set of buttons disposed on the top surface of the main body proximate to the second extension and on a second side of the touchscreen.

18 Claims, 18 Drawing Sheets

Related U.S. Application Data continuation of application No. 14/752,808, filed on Jun. 26, 2015, now Pat. No. 9,381,435, which is a continuation of application No. 13/842,975, filed on Mar. 15, 2013, now Pat. No. 9,116,555, which is a continuation-in-part of application No. 13/539,311, filed on Jun. 30, 2012, now Pat. No. 8,870,654, which is a continuation-in-part of application No. 13/418,691, filed on Mar. 13, 2012, now Pat. No. 8,672,765, and a continuation-in-part of application No. 13/418,703, filed on Mar. 13, 2012, and a continuation-in-part of application No. 13/418,720, filed on Mar. 13, 2012, now abandoned.

(60) Provisional application No. 61/563,505, filed on Nov. 23, 2011, provisional application No. 61/745,281, filed on Dec. 21, 2012.

(51) Int. Cl.

| | | |
|---|---|---|
| *A63F 13/235* | (2014.01) | |
| *G06F 3/033* | (2013.01) | |
| *A63F 13/214* | (2014.01) | |
| *A63F 13/54* | (2014.01) | |
| *A63F 13/211* | (2014.01) | |
| *H04W 4/00* | (2018.01) | |
| *A63F 13/2145* | (2014.01) | |
| *A63F 13/213* | (2014.01) | |
| *G06F 3/0488* | (2013.01) | |
| *A63F 13/21* | (2014.01) | |
| *A63F 13/30* | (2014.01) | |
| *H04W 4/80* | (2018.01) | |
| *A63F 13/42* | (2014.01) | |

(52) U.S. Cl.
CPC ............ *A63F 13/42* (2014.09); *A63F 2300/10* (2013.01); *A63F 2300/1075* (2013.01)

(56) References Cited

U.S. PATENT DOCUMENTS

| | | | | |
|---|---|---|---|---|
| 8,870,654 | B2* | 10/2014 | Nakayama | A63F 13/02 463/37 |
| 2007/0281828 | A1* | 12/2007 | Rice | A63B 71/0622 482/4 |
| 2008/0268956 | A1* | 10/2008 | Suzuki | A63F 13/10 463/37 |
| 2011/0141301 | A1* | 6/2011 | Raghoebardajal | G06T 5/30 348/222.1 |

* cited by examiner

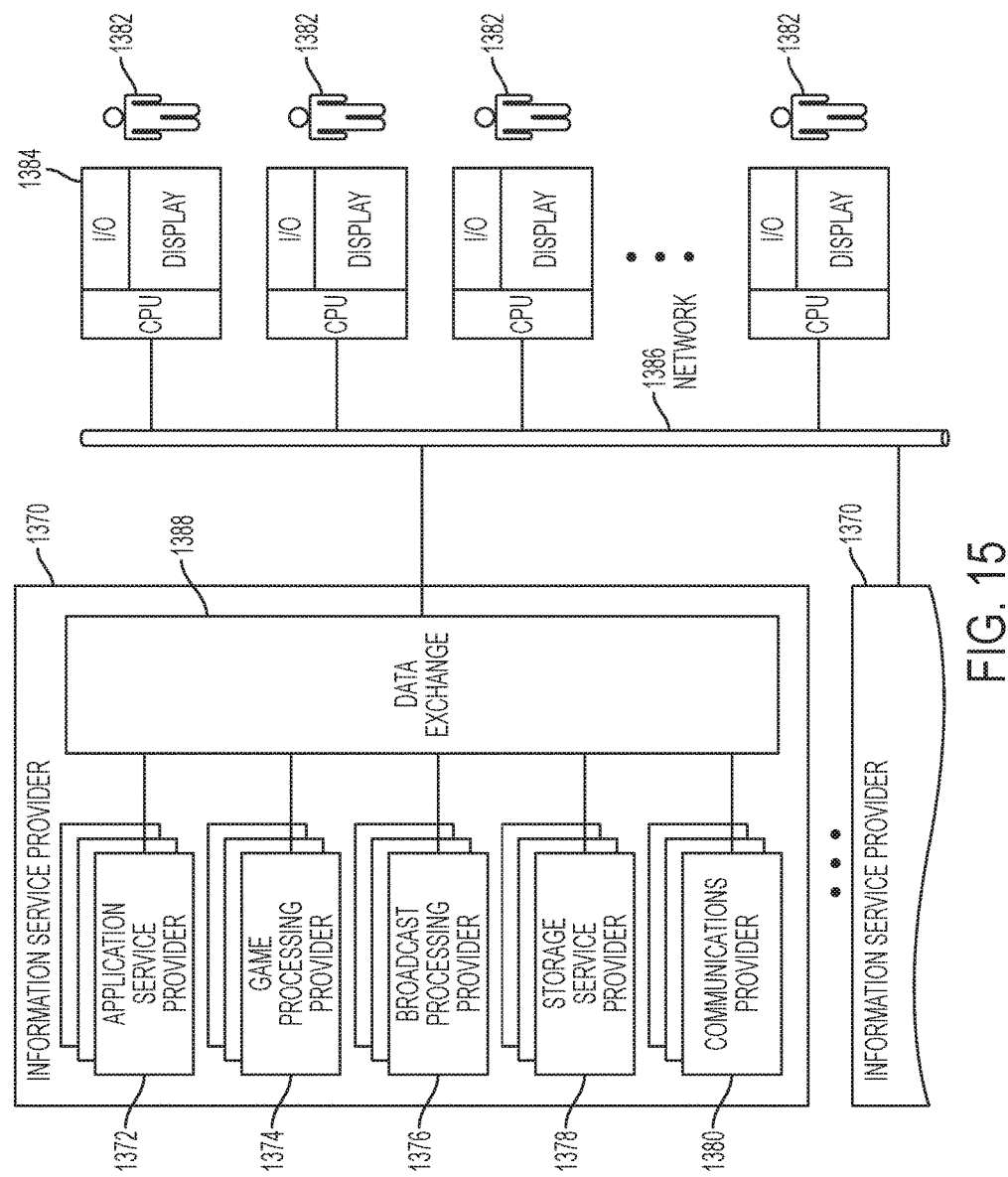

GAMING CONTROLLER

CLAIM OF PRIORITY

This application claims priority as a continuation of U.S. application Ser. No. 15/133,173, filed Apr. 19, 2016, entitled "Gaming Controller," which is a continuation of U.S. application Ser. No. 14/752,808 (now U.S. Pat. No. 9,381,435), filed Jun. 26, 2015, entitled "Gaming Controller," which is a continuation of U.S. application Ser. No. 13/842,975 (now U.S. Pat. No. 9,116,555), filed Mar. 15, 2013, entitled "Gaming Controller," which is a continuation-in-part of U.S. application Ser. No. 13/539,311 (now U.S. Pat. No. 8,870,654), filed Jun. 30, 2012, entitled "Gaming Controller," which claims priority to U.S. Provisional Patent Application No. 61/563,505, filed Nov. 23, 2011.

U.S. application Ser. No. 13/842,975 further claims priority to U.S. Provisional Application No. 61/745,281, filed Dec. 21, 2012, entitled "Automatic Generation of Suggested Mini-Games for Cloud-Gaming Based on Recorded Gameplay."

U.S. application Ser. No. 13/842,975 further claims priority as a continuation-in-part of U.S. application Ser. No. 13/418,691 (now U.S. Pat. No. 8,672,765) filed Mar. 13, 2012, entitled "System and Method for Capturing and Sharing Console Gaming Data."

U.S. application Ser. No. 13/842,975 further claims priority as a continuation-in-part of U.S. application Ser. No. 13/418,703, filed Mar. 13, 2012, entitled "System and Method for Capturing and Sharing Console Gaming Data."

U.S. application Ser. No. 13/842,975 further claims priority as a continuation-in-part of U.S. application Ser. No. 13/418,720, filed Mar. 13, 2012, entitled "System and Method for Capturing and Sharing Console Gaming Data."

The disclosures of these applications are incorporated by reference herein in their entirety for all purposes.

RELATED APPLICATIONS

This application is related to U.S. application Ser. No. 13/839,382 filed Mar. 15, 2013, entitled "Sharing Recorded Gameplay to a Social Graph," the disclosure of which is incorporated by reference herein.

BACKGROUND

1. Field of the Invention

The present invention relates to controllers for interfacing with an interactive program.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. One example of a handheld controller is the DUALSHOCK® 3 wireless controller manufactured by Sony Computer Entertainment Inc.

It is in this context that embodiments of the invention arise.

SUMMARY

Embodiments of the present invention provide a controller for interfacing with an interactive application such as a video game. Several inventive embodiments of the present invention are described below.

In one embodiment, a controller for interfacing with an interactive application is provided, including: a housing defined by a main body, a first extension extending from a first end of the main body, and a second extension extending from a second end of the main body, the first extension and the second extension for holding by a first hand and a second hand of a user, respectively; an input device positioned along a top surface of the main body; a touch-sensitive panel defined along the top surface of the main body.

In one embodiment, the input device is selected from the group consisting of a joystick, a button, a trigger, a directional pad.

In one embodiment, the controller further includes a tracking panel defined along a front side surface of the main body; and a light defined in the main body for illuminating the tracking panel.

In one embodiment, the tracking panel is defined from a translucent material.

In one embodiment, the controller further includes one or more of an accelerometer, a gyroscope, or a magnetometer.

In one embodiment, the input device is a button, the button being configured to activate a sharing interface for sharing recorded gameplay to a social graph of a user.

In one embodiment, sharing recorded gameplay includes sharing one or more of an image or a video clip.

In one embodiment, sharing recorded gameplay includes streaming a live video feed of a user's gameplay.

In another embodiment, a controller for interfacing with an interactive application includes: a housing defined by a main body, a first extension extending from a first end of the main body, and a second extension extending from a second end of the main body, the first extension and the second extension for holding by a first hand and a second hand of a user, respectively; a button positioned along a top surface of the main body, the button being configured to activate a sharing interface for sharing recorded gameplay to a social graph of a user.

In one embodiment, sharing recorded gameplay includes sharing one or more of an image or a video clip.

In one embodiment, sharing recorded gameplay includes streaming a live video feed of a user's gameplay.

In one embodiment, the controller further includes a touch-sensitive panel defined along the top surface of the main body.

In one embodiment, the controller further includes an input device positioned along a top surface of the main body.

In one embodiment, the input device is selected from the group consisting of a joystick, a button, a trigger, a directional pad.

In one embodiment, the controller further includes a tracking panel defined along a front side surface of the main body; and a light defined in the main body for illuminating the tracking panel.

In one embodiment, the tracking panel is defined from a translucent material.

In one embodiment, the controller further includes one or more of an accelerometer, a gyroscope, or a magnetometer.

In another embodiment, a controller for interfacing with an interactive application is provided, including: a housing defined by a main body, a first extension extending from a first end of the main body, and a second extension extending from a second end of the main body, the first extension and the second extension for holding by a first hand and a second hand of a user, respectively; a touch-sensitive panel defined along the top surface of the main body; a button positioned along a top surface of the main body, the button being configured to activate a sharing interface for sharing recorded gameplay to a social graph of a user; a tracking panel defined along a front side surface of the main body; and a light defined in the main body for illuminating the tracking panel.

In one embodiment, the tracking panel is defined from a translucent material.

In one embodiment, sharing recorded gameplay includes sharing one or more of an image or a video clip.

In one embodiment, sharing recorded gameplay includes streaming a live video feed of a user's gameplay.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 15 illustrates an embodiment of an Information Service Provider architecture.

DETAILED DESCRIPTION

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

Figure 1:
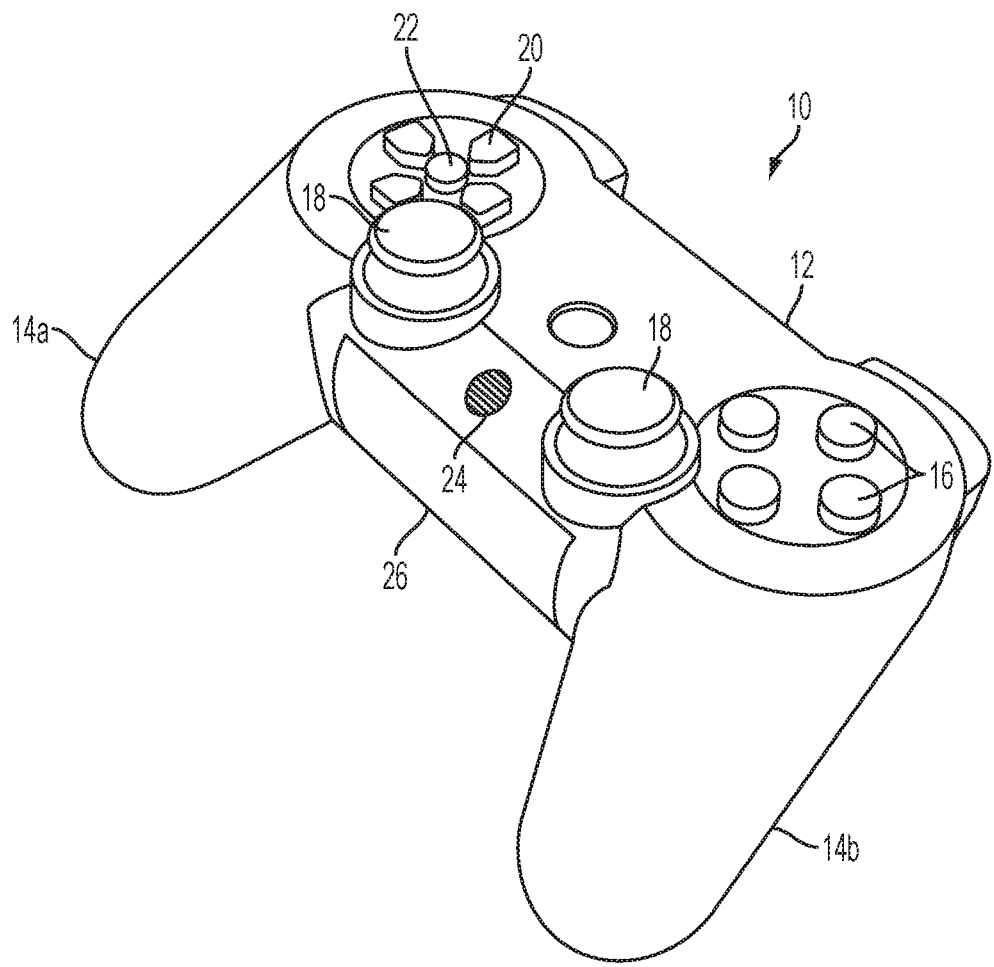
FIG. 1 illustrates a perspective view of a controller 10 for interfacing with an interactive program, in accordance with an embodiment of the invention.

FIG. 1 illustrates a perspective view of a controller 10 for interfacing with an interactive program, in accordance with an embodiment of the invention. The controller 10 includes a main body 12 and extensions 14a and 14b. The extension 14a and 14b are configured to be held by the user's left and right hands, respectively, and thus function as handles or handle portions to enable secure gripping of the controller by the user. On the top surface of the main body 12, there are included various input devices, such as buttons 16, joysticks 18, and directional pad 20. Also shown is the top portion of a 3D control bar 22 which extends through the main body of the controller from top to bottom, and is described in further detail below. A speaker 24 is provided for playing sounds which provide feedback to the user.

Additionally, the controller 10 includes a touch panel 26 defined along the back side of the main body which faces the user when the controller is held in a conventional position. The touch panel 26 is oriented in a substantially vertical fashion and situated between the extensions 14a and 14b so that a user holding the controller by the extensions can readily use the touch panel with the thumb of either hand. The touch panel 26 utilizes a touch-sensitive technology (e.g. resistive, capacitive, etc.) to detect touch gestures. In the illustrated embodiment, the touch panel 26 also has a slight outward curvature from top to bottom which provides a tactile sensation by virtue of its shape that enables the user to readily determine the approximate vertical position of their thumb on the touch panel based on feeling alone.

In another embodiment, the controller 10 may include one or more microphones for capturing sound from the interactive environment. In some embodiments, the microphones may be arranged as an array of microphones. In one embodiment, the arrangement constitutes a linear array of microphones. When three or more microphones are included in the array of microphones, it is possible to determine the location of a sound source relative to the microphone array based on analysis of the captured audio data from the microphone array. More specifically, a sound source can be localized relative to the microphone array based on the relative timing of its sound as captured by each of the microphones of the microphone array. Taken in combination with the known location and orientation of the controller (e.g. as determined based on sensors and tracking methods as defined elsewhere herein), and by extension the known location and orientation of the microphone array, then the location of the sound source within the interactive environment can be determined. Furthermore, captured sound can be processed to exclude sounds which do not emanate from a certain region of the interactive environment.

In one embodiment, the touch panel 26 can be coupled with a display screen to provide a touchscreen interface as part of the controller. The touchscreen interface can be controlled by an interactive application to display various images in accordance with the interactive application. For example, the touchscreen might display an image which delineates regions of the touchscreen that correspond to various functionalities for the interactive application. As another example, the touchscreen might display a line which indicates a gesture that the user may perform. The user might trace the line shown on the touchscreen so as to perform the indicated gesture. As yet another example, the touchscreen might be configured to display a gesture or gestures of the user, by providing a visual trace line of where the user touched and swiped/moved their finger(s) along the touchscreen. In one embodiment, the touchscreen is configured to display the most recent gesture or gestures which have been performed on the touchscreen. By way of example, older gestures may be eliminated from display when a new gesture is detected, or trace lines may be configured to fade from display over time or be eliminated from display after a preset time has elapsed.

Placement of one or more microphones on the controller can be advantageous over alternative microphone placements (e.g. near a display, on a separate device) because the controller is held by the user and therefore in close proximity to the user. Furthermore, where multiple users are present, each operating a controller, then the proximity of each users' corresponding controller to himself/herself helps diminish crosstalk, thereby facilitating better identification of sound as coming from a particular user. Moreover, when multiple controllers are utilized, then the captured audio data from the multiple controllers can be analyzed in combination, along with the locations and orientations of the controllers, to enable determination of the locations from which sounds originate with high levels of accuracy.

Figure 2:
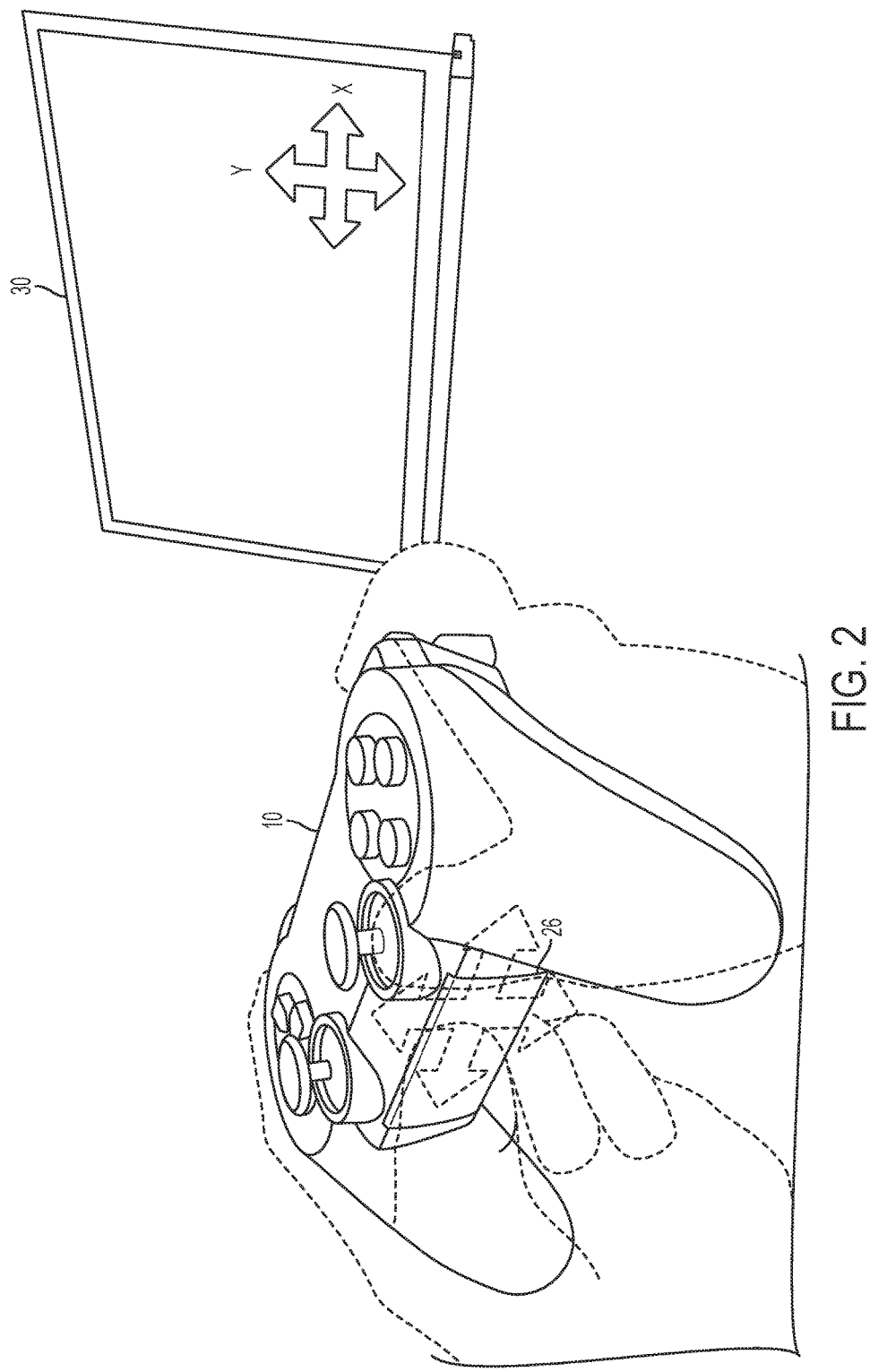
FIG. 2 illustrates a user's hands holding the controller 10 in the vicinity of a display 30, in accordance with an embodiment of the invention.

FIG. 2 illustrates a user's hands holding the controller 10 in the vicinity of a display 30, in accordance with an embodiment of the invention. As can be seen, the vertical orientation of the touch panel 26 is such that the touch panel is substantially parallel to the display screen 30 when the user holds the controller in a normal fashion and faces the display screen. In this manner, the touch panel 26 can be utilized as an intuitive input mechanism for providing directional input in the plane parallel to the display screen 30 (the x-y plane). For example, the touch panel 26 could be utilized to control an on-screen cursor or reticle, or to scroll vertically and horizontally, or provide other types of input along the x-y plane.

Figure 3:
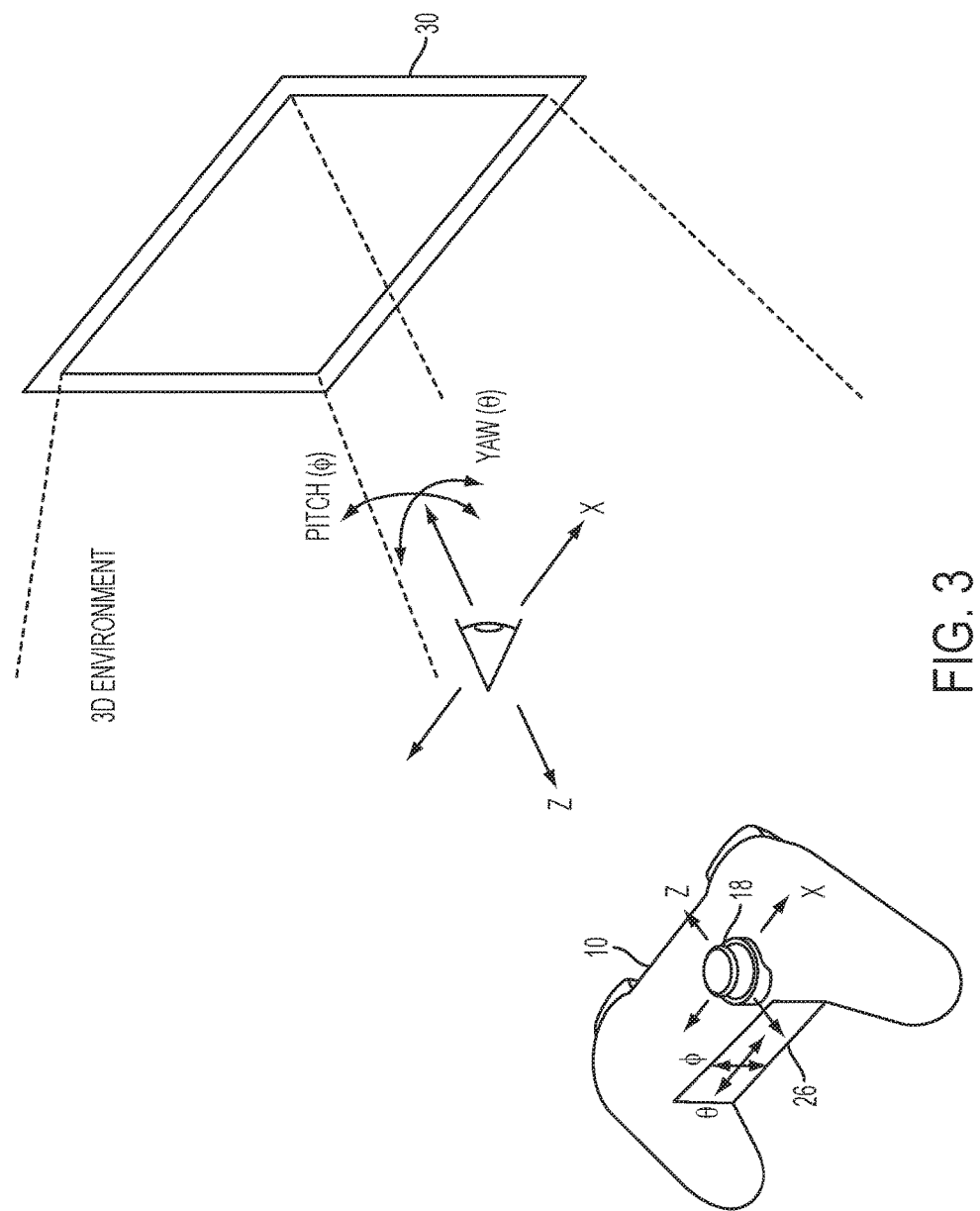
FIG. 3 illustrates combined usage of input devices on the controller 10 to control a virtual viewpoint in a three-dimensional virtual environment, in accordance with an embodiment of the invention.

FIG. 3 illustrates combined usage of input devices on the controller 10 to control a virtual viewpoint in a three-dimensional virtual environment, in accordance with an embodiment of the invention. As shown, the controller 10 is operated in the vicinity of a display 30. In some prior art systems, a controller having two vertically oriented joysticks is utilized to control the movement and orientation of a virtual viewpoint associated with a character or other object in a video game. Typically, one joystick will control the x-axis translation (right and left translation) and z-axis translation (forward and reverse translation) of the viewpoint, while the other joystick controls the pitch (vertical rotation) and yaw (horizontal rotation) of the viewpoint. However, the use of a vertically oriented joystick to control pitch and yaw is non-intuitive, especially as the forward/backward joystick input must be translated into a pitch movement which is essentially a vertically oriented movement. In fact, it is not uncommon for systems to offer a "normal" setting wherein forward and backward motion of the joystick corresponds to positive and negative changes in pitch, respectively, and the exact opposite configuration (sometimes termed an airplane-style configuration) wherein forward and backward motion of the joystick corresponds to negative and positive changes in pitch, respectively.

However, in contrast to the non-intuitive control scheme just described, the touch panel 26 and joystick 18 of the presently disclosed controller 10 can be utilized in a much more intuitive fashion to enable control of a virtual viewpoint. In one embodiment, the joystick 18 is utilized to control x-axis translation and z-axis translation, and the touch panel 26 is utilized to control pitch and yaw. As the touch panel 26 is defined along the side of the main body of the controller and vertically oriented so as to be substantially parallel to the plane of the display 30, its usage to control pitch and yaw is intuitive for the user. In the illustrated embodiment, a right joystick 18 is shown for ease of description only, and not by way of limitation. In embodiments of the controller 10 having left and right joysticks, one or both of the joysticks may be configured to control x-axis and z-axis translation.

In still other embodiments, it will be appreciated that the touch panel 26 and joystick 28 can be combined in other ways to provide control of a virtual viewpoint. For example, the touch panel 26 could be utilized to control pitch and x-axis translation, while the joystick 18 is utilized to control yaw and z-axis translation. Furthermore, while reference has been made to control of a virtual viewpoint, the presently described control schemes can be applied to control the motion, orientation, or position of any type of character, vehicle, weapon, or other object within a virtual environment.

Figure 4A:
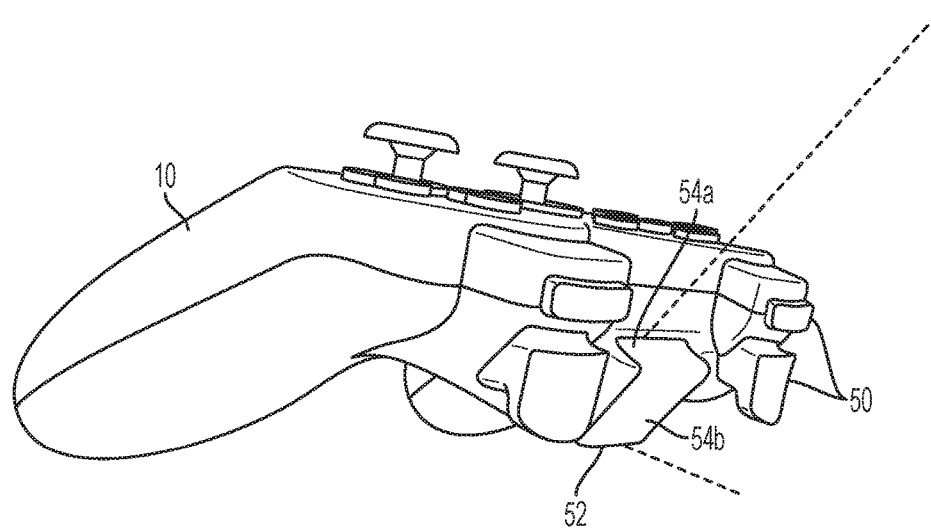
FIGS. 4A and 4B illustrate a side angle view and a front view, respectively, of the controller 10, in accordance with an embodiment of the invention.
Figure 4B:
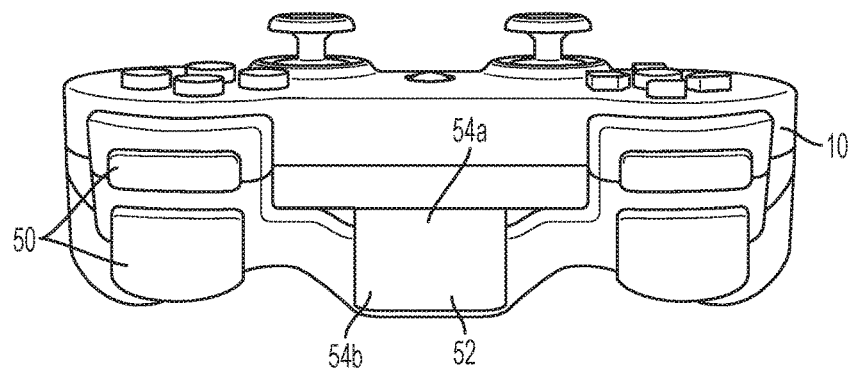

FIGS. 4A and 4B illustrate a side angle view and a front view, respectively, of the controller 10, in accordance with an embodiment of the invention. As shown, the controller 10 includes a tracking panel 52 defined along the front side of the main body opposite the back side on which the touch panel is located. The tracking panel 52 is illuminated and can be visually tracked in accordance with image recognition technologies to determine the location and orientation of the controller 10. The tracking panel 52 can be shaped to provide for a wide angle of visibility. For example, in the illustrated embodiment, the tracking panel 52 includes a top upward facing portion 54a and a bottom downward facing portion 54b which combined provide for a wide angle of visibility to enable the controller 10 to be visually tracked in a large variety of positions. The tracking panel 52 can be defined from a translucent material and illuminated from within by a light source such as one or more LEDs.

Figure 5A:
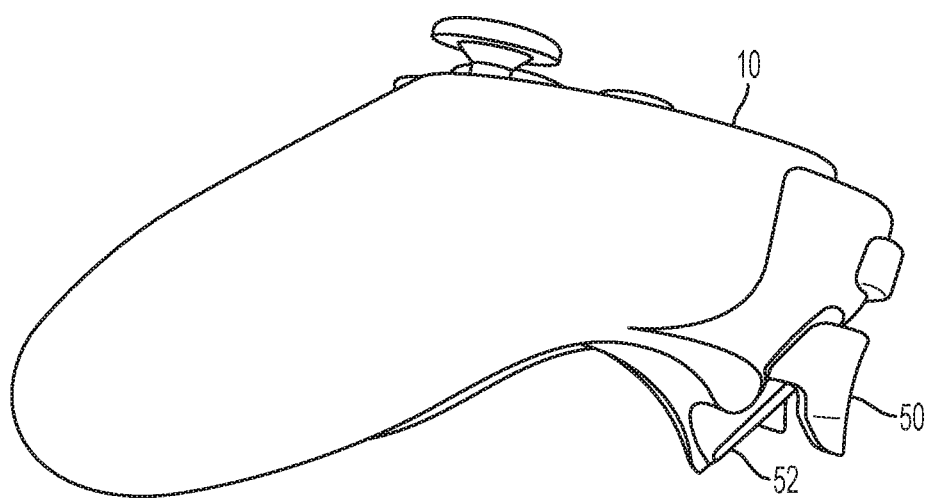
FIG. 5A illustrates a side view of the controller 10, in accordance with an embodiment of the invention.

FIG. 5A illustrates a side view of the controller 10, in accordance with an embodiment of the invention. As can be seen, the tracking panel 52 is defined so as to also function as a support stand for the front portion of the controller, thus preventing the bottom triggers 50 from accidentally being depressed.

Figure 5B:
FIGS. 5B-5M illustrate various tracking features for a tracking panel, in accordance with embodiments of the invention.

It will be appreciated that in various embodiments the tracking panel 52 can have any of various tracking features having various shapes, sizes, or forms. Some examples of such shapes and forms are provided with reference to FIGS. 5B-5M. In one embodiment illustrated at FIG. 5B, the tracking panel can define a single rectangular shape. In other embodiments, the tracking panel can have any other shape, such as a circle, oval, triangle, square, polygon, etc. In another embodiment, the tracking panel may include multiple rectangular shapes, as shown at FIG. 5C. It will be appreciated that the multiple rectangular shapes may be illuminated to be the same color or different colors. While eight rectangular shapes are shown in FIG. 5C, there may be any number of rectangular shapes. In the embodiment of FIG. 5D, the tracking panel is defined by multiple circular shapes. In the embodiment of FIG. 5DE the tracking panel is defined by a single ovoid shape. In the embodiment of FIG. 5F the tracking panel includes multiple shapes, including a square, triangle, circle, and an "X," all of which are horizontally aligned. It will be appreciated that any combination of shapes may be utilized in embodiments of the invention.

When multiple tracking features (e.g., multiple shapes which may be the same or different shapes) are utilized, they may be individually illuminated to facilitate identification of specific controllers when multiple controllers are present. For example, a first controller may be controlled to illuminate a specific one of or combination of the shapes, a second controller may be controlled to illuminate a different specific one of or combination of the shapes, and so forth. In this manner, each of the multiple controllers can be identified and distinguished from each other based on analysis of captured images of the tracking features, as each controller is configured to illuminate a unique one of or combination of the shapes which are present on the controller as tracking features.

Figure 5G:
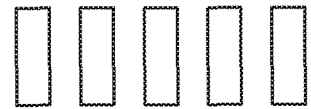
Figure 5C:
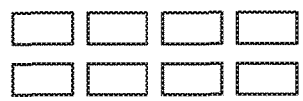
Figure 5H:
Figure 5D:
Figure 5I:
Figure 5E:
Figure 5J:
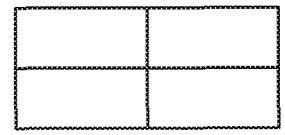
Figure 5F:

In the embodiment of FIG. 5G the tracking panel includes a plurality of vertically oriented rectangles which are positioned as a horizontal array. In the embodiment of FIG. 5H the tracking panel includes multiple horizontally oriented rectangles arranged in a vertical array. FIG. 5I illustrates an embodiment wherein the tracking panel includes letters. It will be appreciated that the tracking panel may include any letters, numbers, symbols, or other characters in accordance with various embodiments of the invention. While embodiments shown have included multiple shapes separated from each other, it will be appreciated that in other embodiments, such as that shown at FIG. 5J, there may be multiple shapes arranged adjacent to each other. In the illustrated embodiment of FIG. 5J, the tracking panel defines multiple rectangles arrayed adjacent to each other with no separation between adjacent rectangles.

Figures 5K, 5L:

It will also be appreciated that the tracking panel may be defined to have various three-dimensional shapes. For example, FIG. 5K illustrates a cross-section view of a tracking panel including a concave-shaped feature for tracking. FIG. 5L illustrates a cross-section view of a tracking panel including a convex-shaped feature for tracking. The foregoing example of features which may be defined as part of a tracking panel are provided by way of example only, and not by way of limitation. It will be appreciated by those skilled in the art that in various other embodiments, the tracking panel may include features of any shape, size, or form.

Figure 5M:
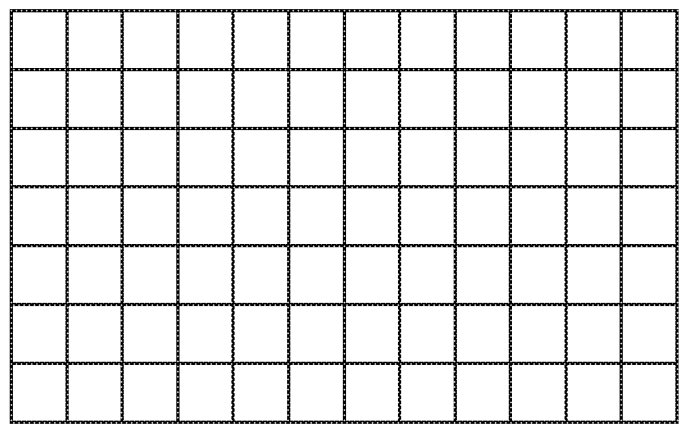

FIG. 5M illustrates a tracking panel defined by a matrix of pixels, each of which may be individually illuminated. In the illustrated embodiment, the particular pattern illuminated by the pixels of the tracking panel can be configured to have any of various designs, and may be configured to display different patterns for different controllers when multiple controllers are in operation.

Figure 6:
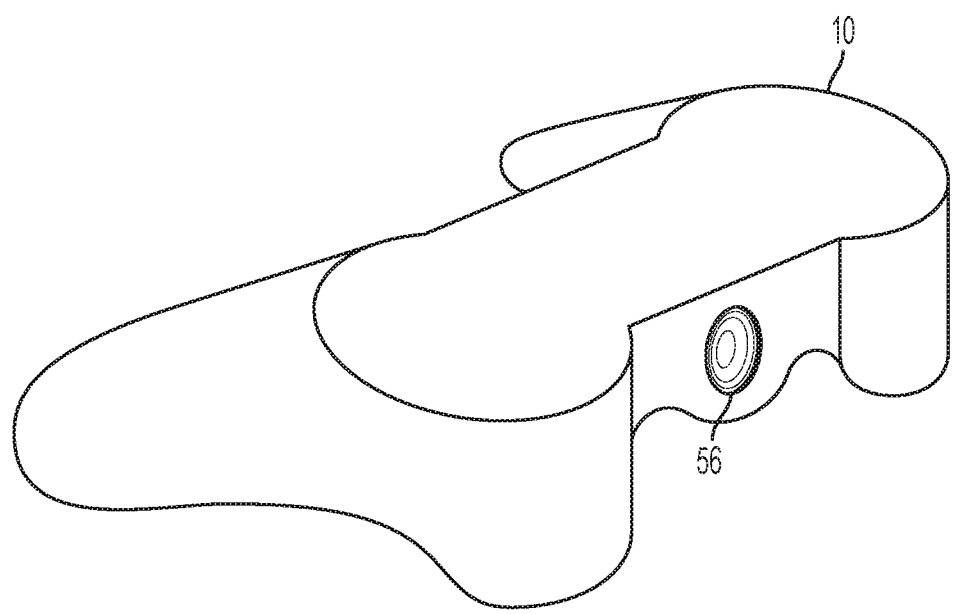
FIG. 6 illustrates a perspective view of a controller 10 having a concave recess 56 defined along a front side of the main body of the controller, in accordance with an embodiment of the invention.

FIG. 6 illustrates a perspective view of a controller 10 having a concave recess 56 defined along a front side of the main body of the controller, in accordance with an embodiment of the invention. The concave recess can be illuminated and utilized for visual tracking of the controller. In one embodiment, the concave recess is differentially lighted: for example, from top to bottom or side to side, employing different colors or different lightness/darkness, with a smooth or sharp transition, or combinations thereof. The differential lighting in combination with changes in size, shape or orientation of the concave recess in captured images of the controller can be detected and analyzed to determine the position and orientation of the controller relative to an image capture device. In various embodiments, the particular shape of the concave recess 56 may vary, both in terms of its surface shape (the shape defined by the concave recess at the surface of the controller) and the shape of the recessed portion. For example, the surface shape may be a rounded shape as shown, a rectangle or bar, polygon, etc. And the recessed portion may be semi-circular, semi-ovoid, angular, faceted, etc. Also, in some embodiments, there may be more than one concave recess defined on the controller.

Figure 7:
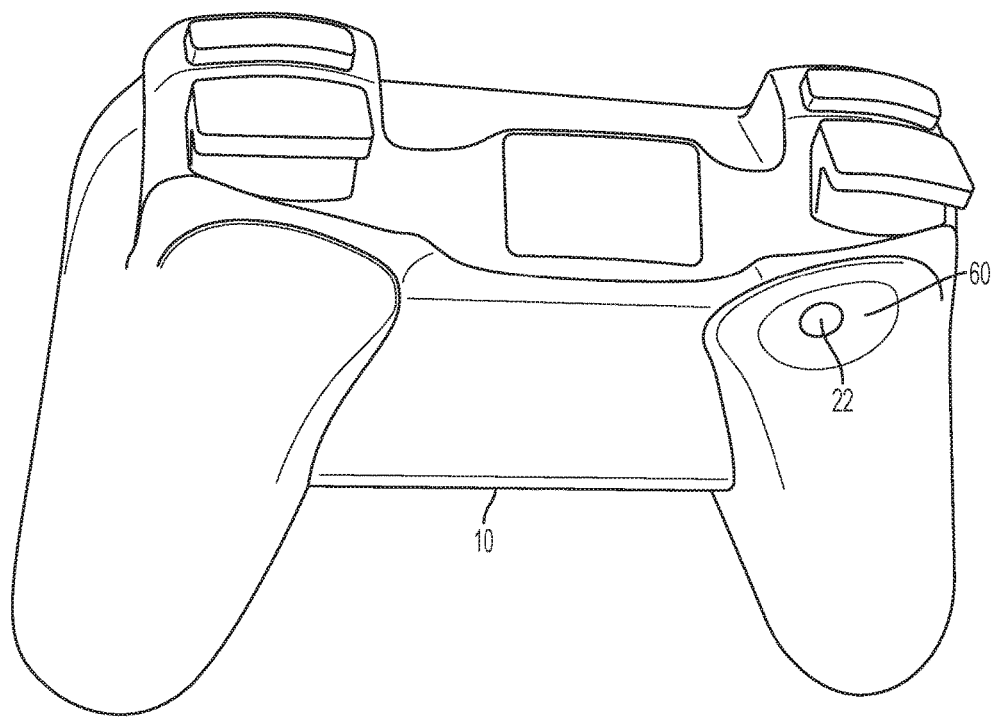
FIG. 7 illustrates a bottom view of a controller 10, in accordance with an embodiment of the invention.

FIG. 7 illustrates a bottom view of a controller 10, in accordance with an embodiment of the invention. The bottom portion of the 3D control bar 22 is visible protruding from a recess 60.

Figure 8:
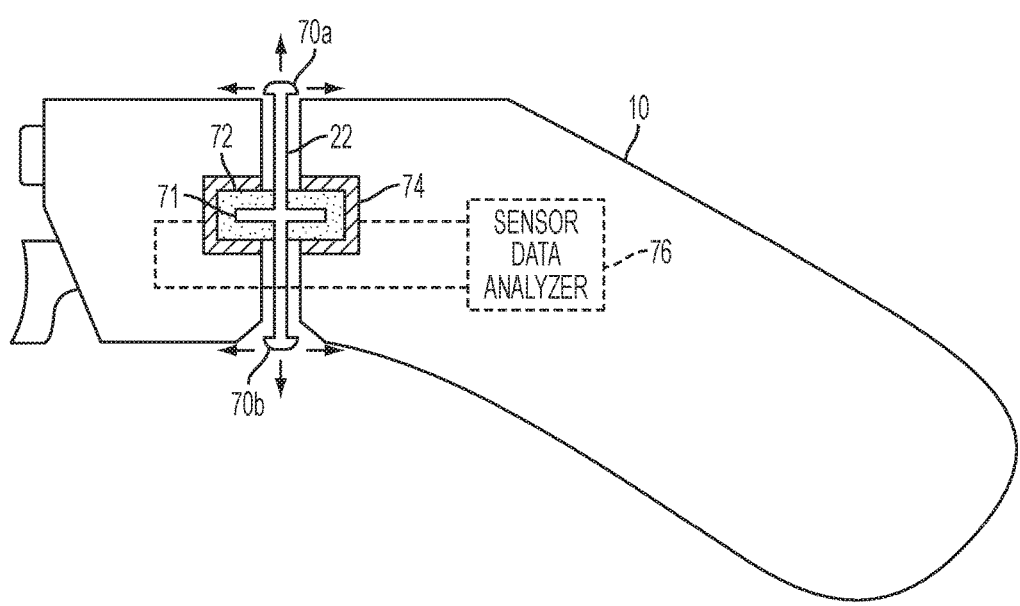
FIG. 8 illustrates a cross-section view of the controller 10, showing the operation of 3D control bar 22.

FIG. 8 illustrates a cross-section view of the controller 10, showing the operation of the 3D control bar 22. As noted, the 3D control bar 22 extends through the main body of the controller from the top surface of the main body to its bottom surface. The 3D control bar 22 includes a top pad 70a and bottom pad 70b for contacting a user's fingers. In one embodiment, the control bar is mounted at its central location and pivots about its central location. Thus, horizontal movement of the top pad 70a causes movement of the bottom pad 70b in the opposite direction, and vice versa. Additionally, in one embodiment, the 3D control bar 22 can be translated in a vertical fashion up or down. In one embodiment, the 3D control bar 22 can also be translated in a horizontal direction, moving the entire control bar in a horizontal manner.

In one embodiment, such freedom of movement of the 3D control bar 22, including pivoting about its central location, and vertical and horizontal translational movement, is accomplished by way of a floating mount. For example, in one embodiment, the central portion of the control bar is mounted in a compliant material 72 which allows the control bar to "float" and thereby facilitates such movements. In one embodiment, the control bar includes a flange 71 to facilitate secure mounting in the compliant material 72. The compliant material can be any type of elastic material which enables the control bar 22 to be moved by a user, but returns the control bar to a normal centered orientation when not affected by the user. A sensor 74 detects movement of the control bar 22, and a sensor data analyzer 76 analyzes the raw data from the sensor to determine the orientation and/or movement of the control bar 22.

Figure 9:
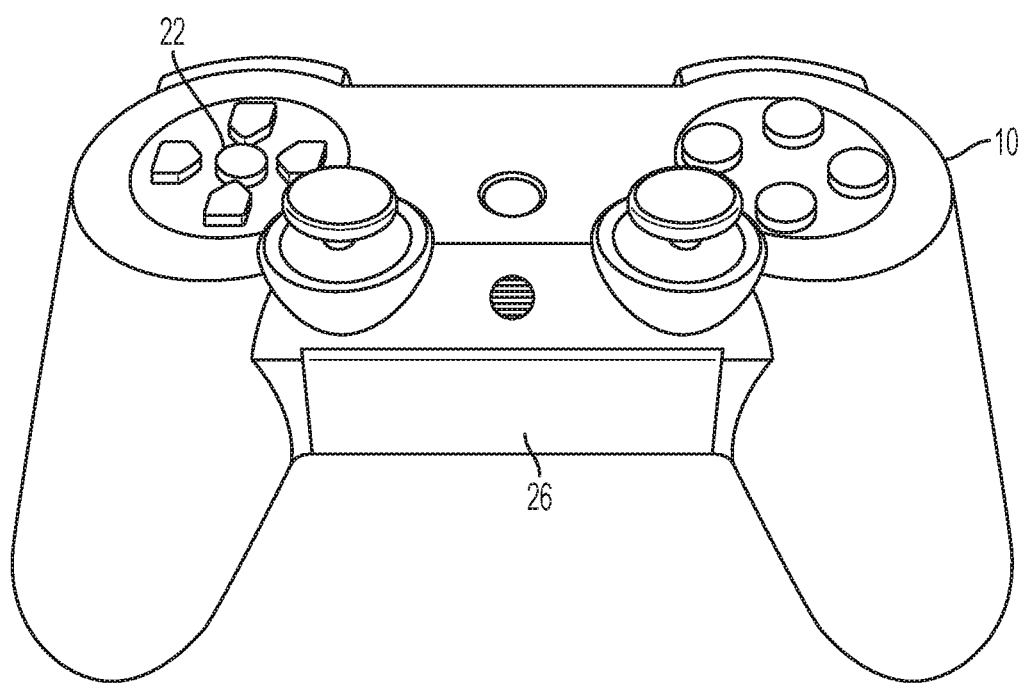
FIG. 9 illustrates a back perspective view of the controller 10, in accordance with an embodiment of the invention.
Figure 10A:
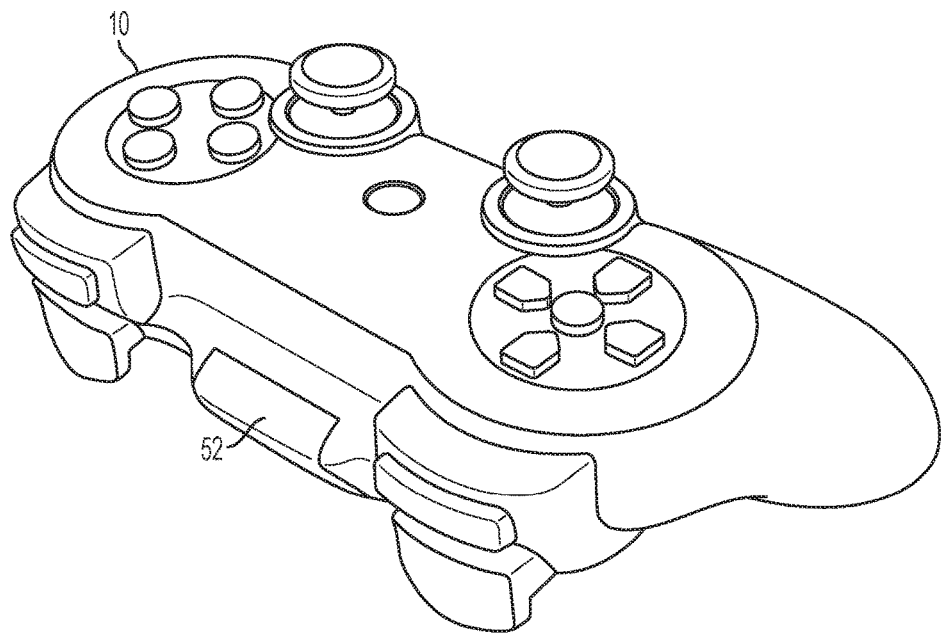
FIG. 10A illustrates another perspective view of the controller 10, in accordance with an embodiment of the invention.
Figure 10B:
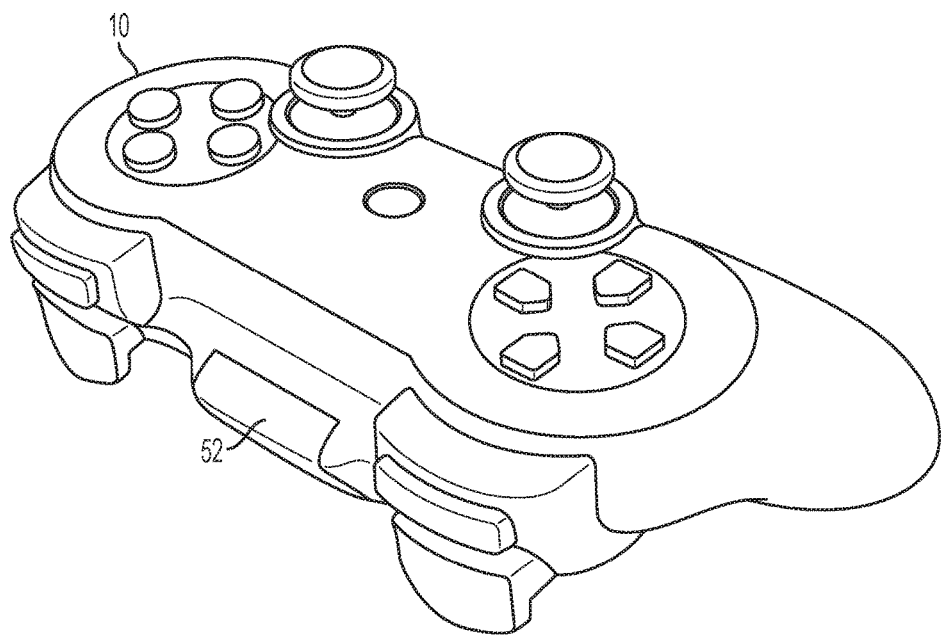
FIG. 10B illustrates the controller 10 without the 3D control bar, in accordance with an embodiment of the invention.

FIG. 9 illustrates a back perspective view of the controller 10, in accordance with an embodiment of the invention. FIG. 10A illustrates another perspective view of the controller 10, in accordance with an embodiment of the invention. FIG. 10B illustrates the controller 10 without the 3D control bar, in accordance with an embodiment of the invention.

It will be appreciated that in various embodiments, a controller may include any of various additional features, including but not limited to, tactile feedback mechanisms such as a vibration mechanism, various data and power connectors such as a USB connector, various inertial sensors such as accelerometers, gyroscopes, and magnetometers, etc. Additional details regarding possible features which may be included in a controller can be found with reference to U.S. application Ser. No. 12/259,181, filed Oct. 27, 2008, entitled "Determining Location and Movement of Ball-Attached Controller," and to U.S. application Ser. No. 11/382,036, filed May 6, 2006, entitled "Method and System for Applying Gearing Effects to Visual Tracking," the disclosures of which are incorporated by reference herein.

Figure 11A:
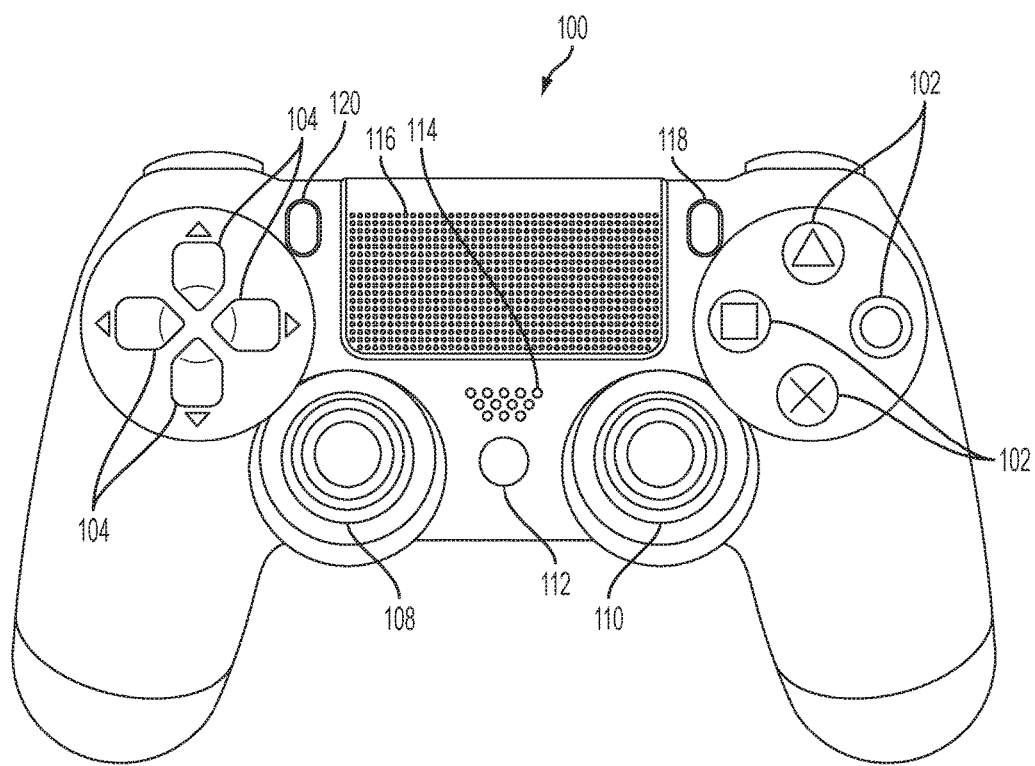
FIG. 11A illustrates a top view of a controller device, in accordance with an embodiment of the invention.

FIG. 11A illustrates a top view of a controller device 100, in accordance with an embodiment of the invention. The controller 100 includes various buttons 102 which can be configured for various purposes, as well as directional buttons 104 for providing directional input. A left joystick 108 and a right joystick 110 are provided. A system button 112 can perform or otherwise provide access to various system functions such as exiting a video game, suspending or turning off a game console, turning off the controller device 100, etc.

A speaker 114 is provided for allowing audio output to occur at the controller, which can enrich a user's gameplay by allowing certain audio to be presented through the controller rather than in conjunction with the rest of the audio output of the video game. For example, ambient sounds from a virtual environment of a video game might be presented through normal audio mechanisms (e.g. as part of the video output of the video game) whereas audio from communications (e.g. a phone call, radio communication, etc.) are specifically presented through the controller speaker 114. When multiple players are engaged in gameplay, audio for a specific player can be routed to the controller being operated by that player. In this manner, players of a multiplayer game can each receive audio that is specific for them, and easily discern that such audio is intended for them, even when engaged in gameplay in the same local gameplay environment.

The controller device 100 includes a touch-sensitive pad 116 to facilitate touch-based input. An options button 118 can be configured to provide access to various options, which may be specific to a game console, a cloud gaming platform, a specific video game, or some other context. A share button 120 can provide access to a sharing interface for sharing a user's gameplay to a social network, such as sharing screenshots or video clips of the user's gameplay, or initiating live streaming of the user's active gameplay. In one embodiment, the share button provides access to buffered video of the user's recent gameplay, from which the user may select a portion or a screenshot for sharing to a social network, such as a gaming social network or other social network.

Figure 11B:
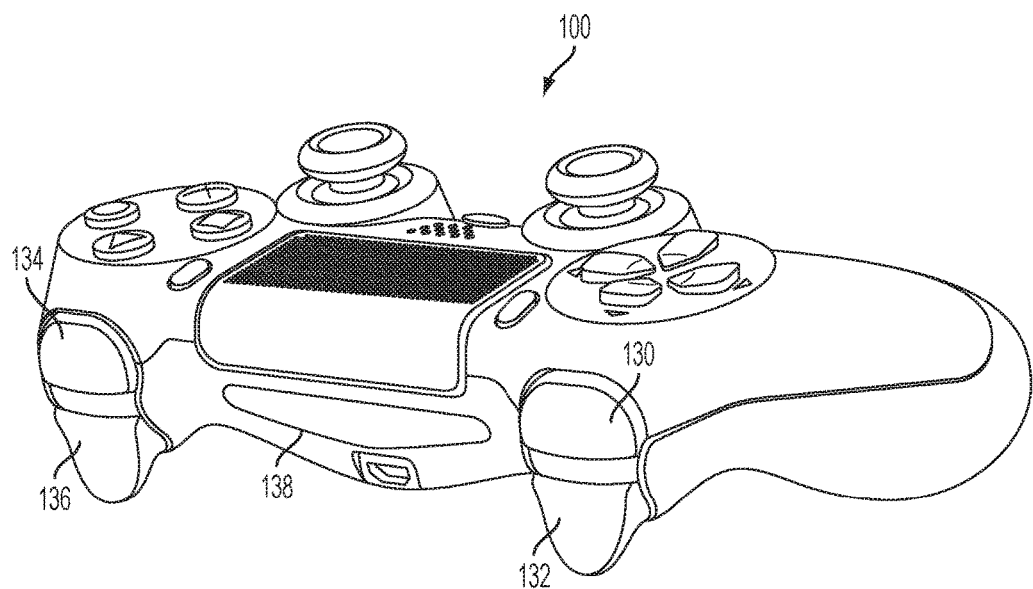
FIG. 11B illustrates a perspective view of a controller device, in accordance with an embodiment of the invention.

FIG. 11B illustrates a perspective view of the controller device 100, in accordance with an embodiment of the invention. As shown, the controller 100 includes trigger buttons 130, 132, 134, and 136, which provide additional inputs for gameplay. A light bar 138 is defined on the front side of the controller 100 to facilitate identification and tracking of the controller 100. The light bar 138 can be illuminated to have a specific color, and can be identified from captured images of the gameplay environment. It will be appreciated that the location and orientation of the controller 100 can be determined by tracking the light bar 138.

In one embodiment, a method for storing gameplay is contemplated. Gameplay can be executed by the operating system of a game console in response to a user request, which can come in the form of a standard file operation with respect to a set of data associated with the desired gameplay. The request can be transmitted from an application associated with a game. The gameplay can comprise, for example, video content, audio content and/or static visual content, including wallpapers, themes, code "add-on" content, or any other type of content associated with a game. It is contemplated that such content can be user- or developer-generated, free or paid, full or trial, and/or for sale or for rent.

A portion of the gameplay can be buffered, i.e., stored temporarily. For example, the previous 15 seconds, the previously completed level, for the previous action within the gameplay can be stored temporarily, as described further herein. The term "portion" used herein can correspond to any part of the gameplay that is divisible into any related or arbitrary groups of single or multiple bits or bytes of data. For example, "portions" of gameplay may correspond to levels, chapters, scenes, acts, characters, backgrounds, textures, courses, actions, songs, themes, durations, sizes, files, parts thereof, and combinations thereof. Further, portions of gameplay can comprise screenshots or prescribed durations of video capture.

In one embodiment, portions of the gameplay can be stored locally on the game console in either temporary or permanent storage. Alternatively or additionally, portions of the gameplay can be transmitted over a network stored remotely. For example, portions of the gameplay can be transmitted over a wireless or wired network to another computing device, to another game console, or to a remote server. Such remote servers may include social media servers.

Optionally, portions of the gameplay not retrieved from the buffer or portions of the gameplay outside a particular gaming interval (e.g., a particular duration, level, chapter, course, etc.) can be removed from the buffer. This removal process can be completed using standard file operations on the operating system.

The portions of the gameplay can be displayed on any of a number of display devices having access to the stored gameplay. For example, the stored gameplay can be displayed on a television set connected to the game console from which the gameplay was captured. In another example the stored gameplay can be displayed on a computer to which the stored gameplay was transmitted. The stored gameplay can be displayed alone or in conjunction with other information, such as on a social media website.

In one embodiment, portions of the gameplay are displayed by another game console associated with the user other than the user that buffered or captured the gameplay. According to this embodiment, the portions of the gameplay may show a ball being thrown from a first user to a second user, from the point of view of the first user. The portions of gameplay can then be transmitted to the game console of the second user. Thus, the second user can then view the gameplay from the point of view of the first user. The second user can also have portions of gameplay stored showing the ball being thrown by the first user and caught a second user, from the point of view of the second user. In this embodiment the second user can review the gameplay from both point of view the first user and the point of view of the second user. Still further, the portions of the gameplay stored by the second user can be transmitted to the game console of the first user, so that the first user may review the gameplay from two points of view. This embodiment can apply to any number of users having any number of points of view, so the gameplay can be reviewed from any number of different perspectives.

With respect to storage, transmission and/or display of the portions of the gameplay as described herein, it is contemplated that portions of the gameplay can be stored, transmitted and displayed as image or video data. In another embodiment, however, portions of the gameplay can be stored and transmitted as telemetry or metadata representative of the image or video data, and can be re-created as images or video by a game console or other device prior to display.

In some embodiments, the portion of the gameplay has a predetermined relationship with the executed gameplay. For example, the portion of the gameplay can correspond to a certain amount of gameplay prior to the currently executing gameplay, such as the previous 10 seconds of gameplay. In another embodiment, a first portion of the gameplay has a predetermined relationship with a second portion of the gameplay. For example, the first portion of the gameplay can correspond to a certain amount of gameplay prior to receipt of a request to capture a second portion of gameplay, such as the 10 seconds of gameplay prior to selection of a capture button. In each of these embodiments, the amount of gameplay buffered prior to the current gameplay or the requested gameplay can be configured and adjusted by the user according to his or her particular preferences.

In other embodiments, the buffer is "smart" or "elastic," such that it captures gameplay according to variables without regard to time. In one such embodiment, the first portion of the gameplay has a predetermined relationship with an event related to the gameplay. For example the first portion of the gameplay may be buffered to include a statistical anomaly, such as a high score being reached, the gathering of a large number of points in a short amount of time, the multiple selections of buttons on a controller, and other rare events. Such statistical anomalies can be determined by comparing gameplay metrics to average metrics for a particular game or scene or for all games generally. Such average metrics can be stored locally or remotely for comparison. For example, the game console can track global high scores for a particular game, and buffer gameplay in which a user approaches and surpasses that high score. In another example, a remote server can track global high scores for a particular game, and can communicate that information to the game console, which buffers gameplay in which the user approaches and surpasses that high score.

In another example, the portion of the gameplay can be buffered to include an achievement, such as a trophy being attained or other landmark being reached. Such trophies or landmarks memorialized any goal or gaming achievement, such as a certain number of points being attained, a certain level being reached, and the like. For example, gameplay can be buffered to include the awarding of a trophy for reaching level 10, for reaching 100,000 points, etc.

Similarly, progress toward reaching an event, in addition to the actual attainment of the trophy or statistical anomaly, can be buffered to be included in the portion of the gameplay. For example, a screenshot can be taken at each of levels one through 10, creating a photo album to memorialize the receipt of a trophy for reaching level 10. Another example, a video can be taken of the user winning a race for the first through fifth times, where a trophy is awarded for five wins.

Thus, according to embodiments of the invention, at least a portion of executed gameplay can always be kept in a running buffer. In other words, when a request to share a portion of the gameplay is received, a portion of the prior gameplay can already be captured to include previous footage. For example, if a request to share gameplay is received after a user crosses the finish line in a racing game, the buffered gameplay can include footage of the user crossing the finish line. In other words, a user will be able to capture moments occurring before a request is made to share gameplay.

It will be appreciated that the user may share gameplay (e.g. a selected screenshot, video, or live gameplay stream) to one or more specifically selected friends, to their entire social graph, or to any user of the social network. The social network can be a gaming social network associated with the platform on which the video game is run, or a third-party social network that exists separate from the video game or its platform. The social network can be accessed through an API defined to allow interfacing with the social network. Users to whom gameplay has been shared may receive a notification informing them of the shared gameplay. Such a notification may take the form of a posting to a social news feed, a private message through the social network, an in-game notification, an e-mail, a chat notification, etc. Sharing gameplay to the social network may entail making the gameplay available to other subsets of users of the social network who may or may not be part of the sharing user's social graph. For example, for a given video game, gameplay may be shared or made available to any user of the social network who also owns the video game and therefore is granted access to shared gameplay of the video game. Such shared gameplay may be accessed through online forums, chat rooms, or other online channels that are available only to players of the video game. In one embodiment, a video game may have a dedicated page or site on the social network. Shared gameplay can be made available to users accessing the page or site of the video game game. Of course, it will be appreciated that from the perspective of the sharing user, options can be provided to allow the user to specify and tailor who and what forum to which their gameplay will be shared.

Though various interfaces for sharing can be accessed from a dedicated button press (e.g. pressing the controller share button), it will be appreciated that in other embodiments, some or all of these interfaces may not be required to facilitate sharing of gameplay to a user social graph. For example, in one embodiment, the controller share button can be configured to capture a screenshot of the user's gameplay when pressed. The captured screenshot can then be automatically uploaded and shared to the user's social graph.

In another embodiment, pressing the share button on the controller initiates recording of gameplay video. When the share button is pressed a second time, recording of the gameplay video is stopped, and the video clip can be uploaded and shared to the user social graph. In one embodiment, the uploading and sharing of the video clip to the user social graph may take place automatically following termination of the video recording operation. However, in another embodiment, when the share button is pressed a second time to stop recording, an interface is presented to allow the user to customize various options such as trimming the video, selecting a representative screenshot for the video, determine specific users with whom to share the video with, add a caption or title, etc. After customization by the user, the video can be shared with others or otherwise made available for viewing.

In one embodiment, the share button on the controller can be configured to share a predefined duration of gameplay video on a social network. For example, a user might specify that when the share button is pressed, the previous 10 seconds of gameplay video will be shared to the user's social graph. In another embodiment, it may be specified that when the share button is pressed, the next 10 seconds of gameplay video will be recorded and shared to the social graph. It should be appreciated that options for trimming the video and performing other types of customization may be applied to the recorded gameplay video. Furthermore, recorded gameplay video of a predefined duration following the button trigger can be combined with previously buffered gameplay video as has been described.

In yet another embodiment, the share button on the controller device can be configured to initiate live video streaming of the users active gameplay. A live video streaming can be predefined to be made available only to members of the user social graph, or to other smaller or larger groups of users, such as a specific subset of the user social graph, all users who own or otherwise have access to the same video game, any user of the gaming platform, etc.

Figure 12:
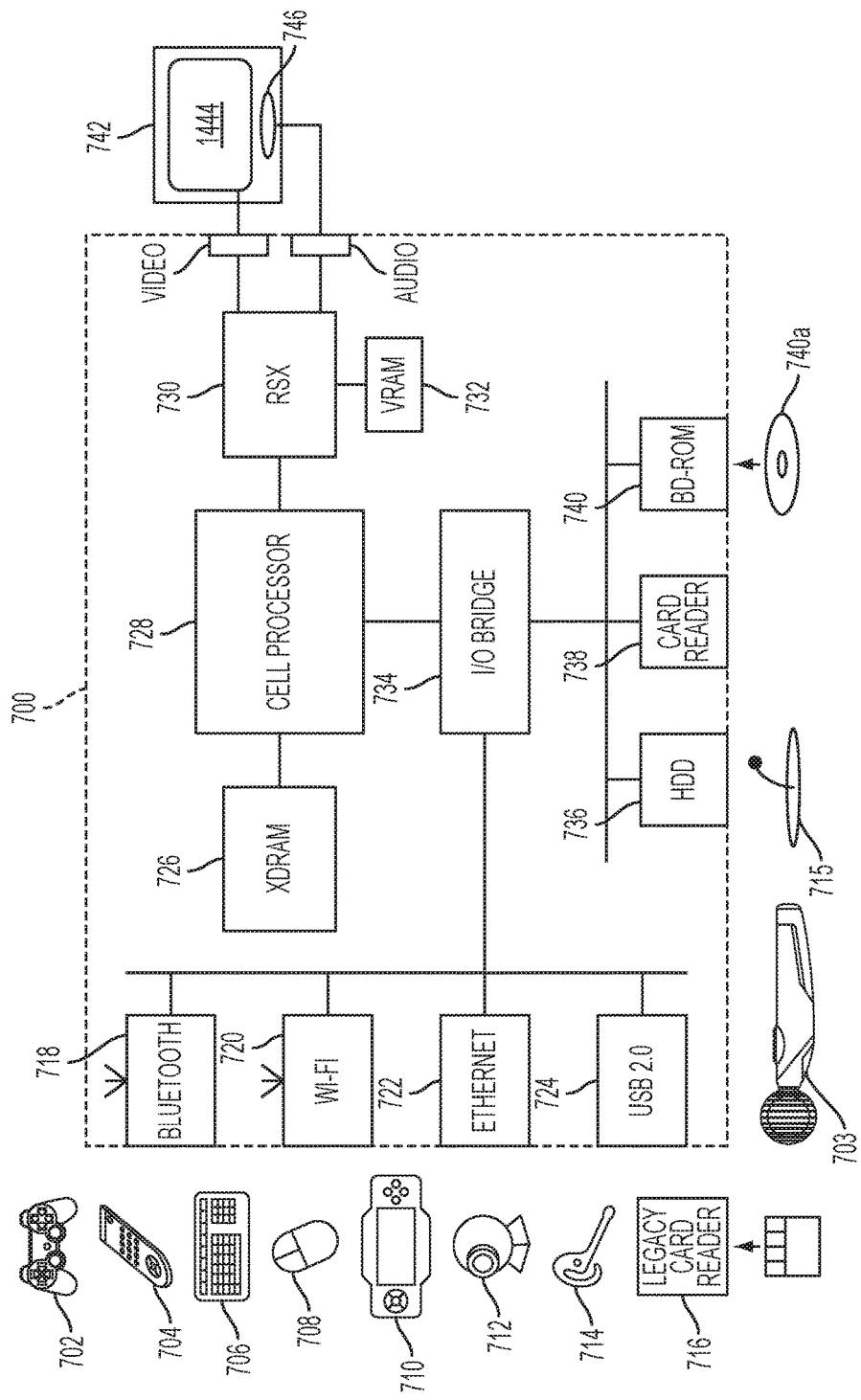
FIG. 12 illustrates hardware and user interfaces that may be used to provide interactivity with a video game, in accordance with one embodiment of the present invention.

FIG. 12 illustrates hardware and user interfaces that may be used to provide interactivity with a video game, in accordance with one embodiment of the present invention. FIG. 12 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740*a* and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 13:
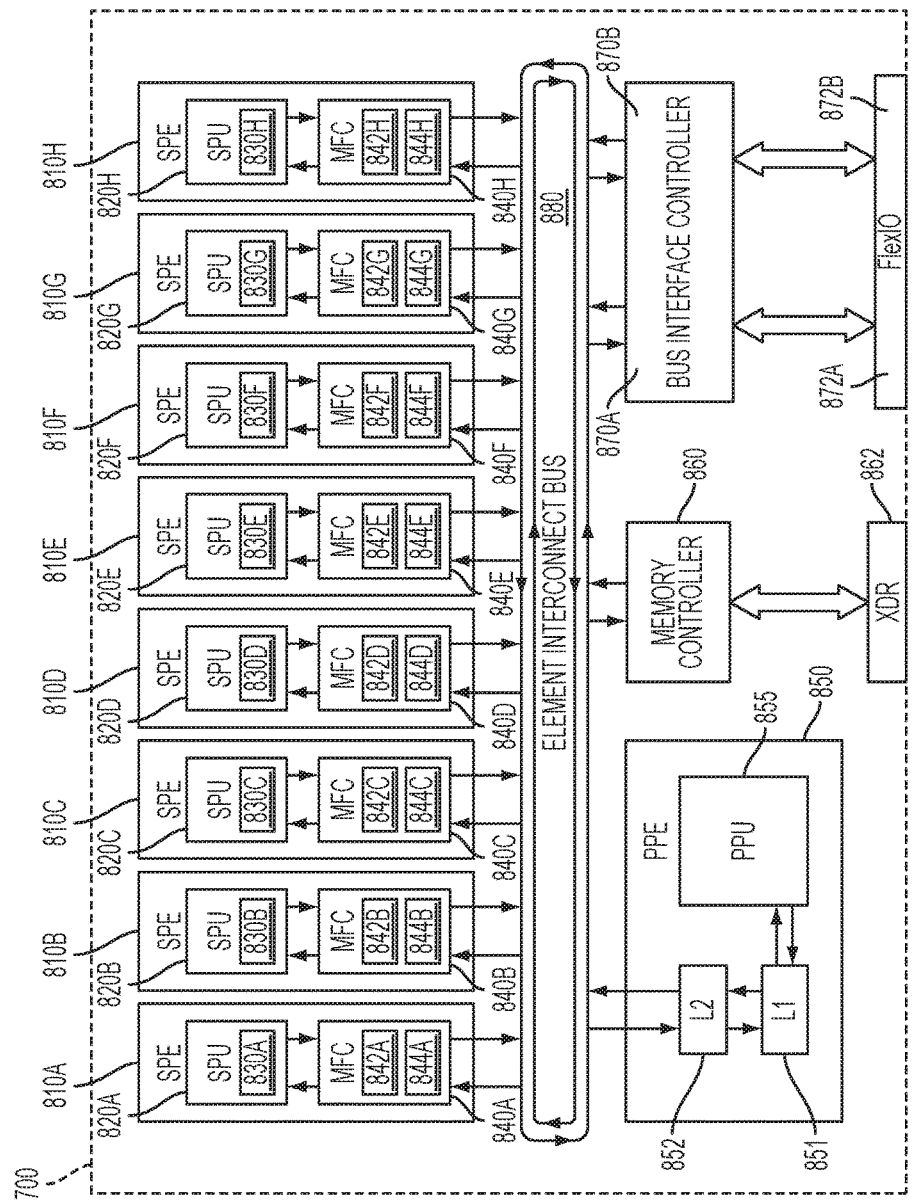
FIG. 13 illustrates additional hardware that may be used to process instructions, in accordance with one embodiment of the present invention.

FIG. 13 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 14:
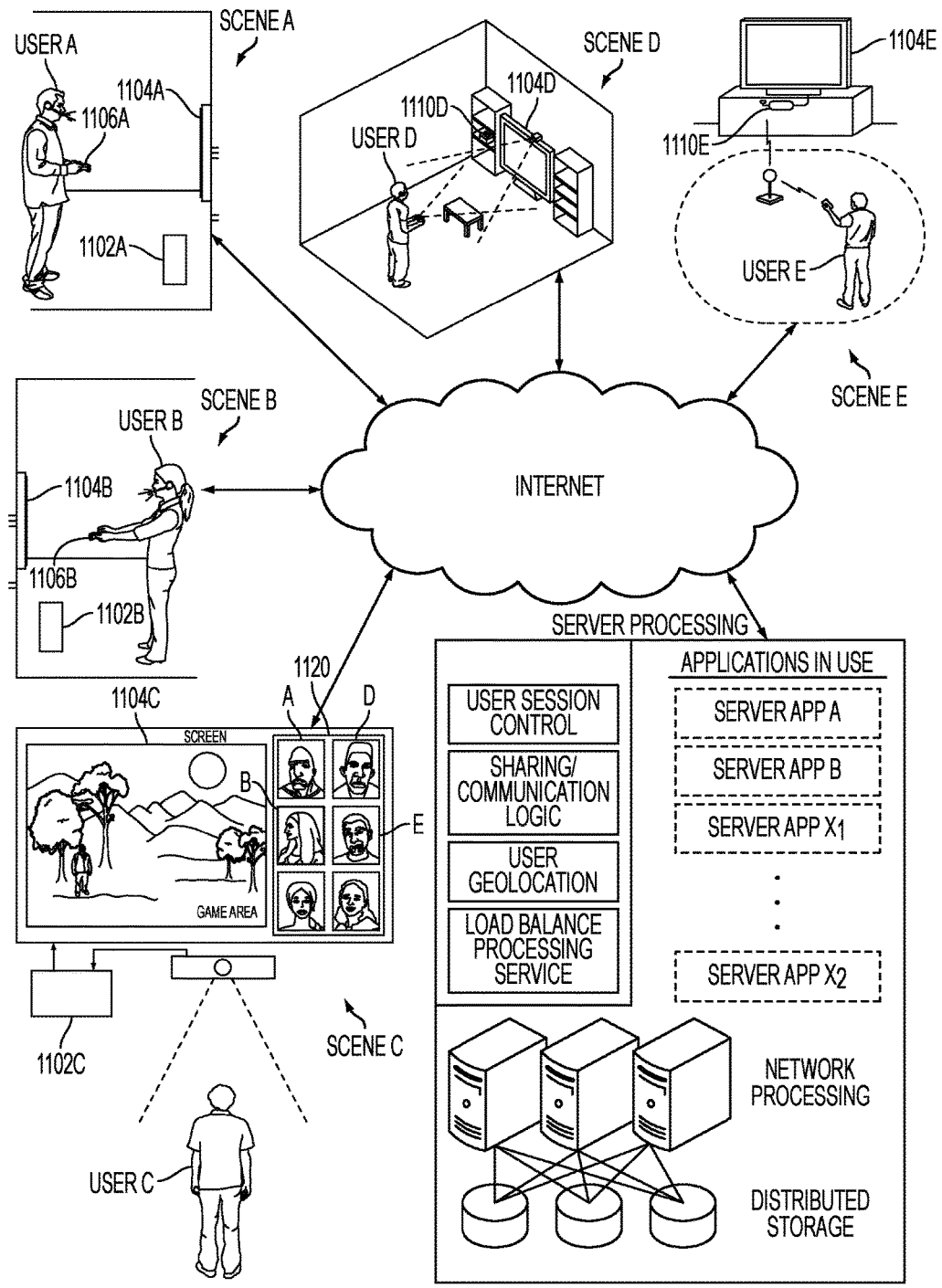
FIG. 14 is an exemplary illustration of scene A through scene E with respective user A through user E interacting with game clients 1102 that are connected to server processing via the internet, in accordance with one embodiment of the present invention.

FIG. 14 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 14, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 14 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

FIG. 15 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for interfacing wirelessly with a computing device, comprising:
    a housing defined by a main body, a first extension extending from a first end of the main body, and a second extension extending from a second end of the main body, the first extension and the second extension for holding by a first hand and a second hand of a user, respectively;
    a touchscreen defined along the top surface of the main body between the first extension and the second extension;
    a first set of buttons disposed on the top surface of the main body proximate to the first extension and on a first side of the touchscreen; and
    a second set of buttons disposed on the top surface of the main body proximate to the second extension and on a second side of the touchscreen.

2. The controller of claim 1, wherein the touchscreen is configured to display images controlled by an interactive application that is executed by the computing device.

3. The controller of claim 1, further comprising:
    a translucent panel defined along a front side of the main body; and
    a light defined in the main body for illuminating the translucent panel;
    wherein the translucent panel is configured to be visually tracked to determine a location and/or an orientation of the controller.

4. The controller of claim 1, further comprising:
    a button positioned along the top surface of the main body, the button being configured to activate a sharing interface for sharing gameplay to a social graph.

5. The controller of claim 4, wherein sharing gameplay includes sharing one or more of an image, a pre-recorded video, or a live video feed of a user's gameplay.

6. The controller of claim 4, wherein the shared gameplay is defined by a portion of buffered video of the user's gameplay.

7. A controller for interfacing with a game console, comprising:
    a housing defined by a main body, a first extension extending from a first end of the main body, and a second extension extending from a second end of the main body, the first extension and the second extension for holding by a first hand and a second hand of a user, respectively;
    a wireless communication device for processing communication to and from the game console;
    an inertial sensor, the inertial sensor configured for detecting motion data of the controller;
    a touchscreen interface defined along the top surface of the main body between the first extension and the second extension, the touchscreen interface configured to display images from an interactive application executed by the game console;
    a first set of buttons disposed on the top surface of the main body proximate to the first extension; and
    a second set of buttons disposed on the top surface of the main body proximate to the second extension.

8. The controller of claim 7, further comprising:
    a light bar defined along a front side of the main body, wherein the light bar is configured to be visually tracked to determine a location and/or an orientation of the controller.

9. The controller of claim 7, further comprising:
    one or more joysticks positioned along the top surface of the main body.

10. The controller of claim 7, further comprising a speaker positioned along the top surface of the main body.

11. The controller of claim 7, wherein the wireless communication device is configured to send input data from the controller to the game console, and further configured to receive feedback data from the game console.

12. A controller for interfacing with a game console, comprising:
    a housing defined by a main body, a first extension extending from a first end of the main body, and a second extension extending from a second end of the main body, the first extension and the second extension for holding by a first hand and a second hand of a user, respectively;
    a wireless communication device for processing communication to and from the game console;
    at least one inertial sensor selected from one of an accelerometer, a gyroscope or a magnetometer;
    a touchscreen defined along the top surface of the main body between the first extension and the second extension;
    a first set of buttons disposed on the top surface of the main body proximate to the first extension; and
    a second set of buttons disposed on the top surface of the main body proximate to the second extension.

13. The controller of claim 12, further comprising:
    a light defined along a front side of the main body, wherein the light is configured to be visually tracked to determine a location and/or an orientation of the controller.

14. The controller of claim 12, wherein the wireless communication device is configured to send input data from the controller to the game console, and further configured to receive feedback data from the game console.

15. The controller of claim 12, wherein the wireless communication device provides for data communication in accordance with a Bluetooth® protocol.

16. The controller of claim 12, wherein each of the first extension and the second extension extend from a back side of the main body.

17. The controller of claim 12, further comprising:
    one or more joysticks positioned along the top surface of the main body.

18. The controller of claim 12, further comprising a speaker positioned along the top surface of the main body, wherein the speaker is configured to present a first audio portion from the game console, the first audio portion being separate from a second audio portion that is transmitted by the game console to a display device.

\* \* \* \* \*